(12) United States Patent
Rathore et al.

(10) Patent No.: US 12,540,158 B2
(45) Date of Patent: Feb. 3, 2026

(54) PROCESS FOR PREPARATION OF PEGYLATED THERAPEUTIC PROTEINS

(71) Applicant: Indian Institute of Technology Delhi, New Delhi (IN)

(72) Inventors: Anurag S Rathore, New Delhi (IN); Nikhil Kateja, New Delhi (IN); Nitika, New Delhi (IN)

(73) Assignee: Indian Institute of Technology Delhi, New Delhi (IN)

( * ) Notice: Subject to any disclaimer, the term of this patent is extended or adjusted under 35 U.S.C. 154(b) by 876 days.

(21) Appl. No.: 17/782,161

(22) PCT Filed: Dec. 3, 2020

(86) PCT No.: PCT/IN2020/050999
§ 371 (c)(1),
(2) Date: Jun. 2, 2022

(87) PCT Pub. No.: WO2021/111470
PCT Pub. Date: Jun. 10, 2021

(65) Prior Publication Data
US 2023/0002441 A1 Jan. 5, 2023

(30) Foreign Application Priority Data
Dec. 3, 2019 (IN) .............................. 201911049731

(51) Int. Cl.
C07K 1/107 (2006.01)
C07K 1/18 (2006.01)
C07K 14/535 (2006.01)

(52) U.S. Cl.
CPC .............. *C07K 1/1077* (2013.01); *C07K 1/18* (2013.01); *C07K 14/535* (2013.01)

(58) Field of Classification Search
CPC ....... C07K 1/1077; C07K 1/18; C07K 14/535
See application file for complete search history.

(56) References Cited

FOREIGN PATENT DOCUMENTS

WO 2016/116947 A1 7/2016

OTHER PUBLICATIONS

Madadkar et al., J. Chromatography 8:1-7 (2016) (Year: 2016).*
Lee et al., "N-Terminal Site-Specific Mono-PEGylation of Epidermal Growth Factor," Pharmaceutical Research, vol. 20, No. 5, May 2003.

* cited by examiner

*Primary Examiner* — Prema M Mertz
(74) *Attorney, Agent, or Firm* — United One Law Group LLC; Kongsik Kim; Jhongwoo Peck

(57) ABSTRACT

The present invention provides a novel process of PEGylation and purification of the PEGylated therapeutic proteins. The developed PEGylation protocol provides high yield of PEGylated recombinant proteins (with % mono-PEG conversion of ≥70%) with a much faster reaction completion time indicating high productivity and fast kinetics. Thereafter a displacement mode cation exchange chromatography (CEX) is utilized which is able to remove all the multi-PEGylated impurities in the loading flow-through, simplifying the overall purification process. The novel PEGylation and purification process can be integrated to any existing manufacturing process to offer an end-to-end integrated assembly from inclusion bodies to purified PEGylated product with higher productivity and improved resin utilization.

18 Claims, 4 Drawing Sheets

PROCESS FOR PREPARATION OF PEGYLATED THERAPEUTIC PROTEINS

CROSS-REFERENCE TO RELATED APPLICATIONS

This application is a National Stage Entry of International Application No. PCT/IN2020/050999 filed on Dec. 3, 2020, which claims priority from Indian Application No. 201911049731 filed on Dec. 3, 2019. The aforementioned applications are incorporated herein by reference in their entireties.

TECHNICAL FIELD

The present invention relates to a process for making recombinant PEGylated proteins. More particularly, the present invention pertains to a process for PEGylation and purification of therapeutic protein.

RELATED ART

PEGylation, the chemical linkage of polyethylene glycol (PEG) chains to a therapeutic protein/peptide, has been widely used as a post-production modification methodology to enhance the pharmacokinetic properties of proteins [1]. It has been shown to increase solubility, decrease renal clearance, improve physical and thermal stability, protect against enzymatic degradation, increase circulating half-life, reduce immunogenicity and reduce toxicity [1-4]. Currently, there are more than a dozen PEGylated drugs on the market, and several under clinical development [5].

Granulocyte-colony stimulating factor (GCSF) is a hematopoietic cytokine that stimulates the bone marrow to produce granulocytes and stem cells. G-CSF is an essential biopharmaceutical drug in treatment of neonatal infections, granulocyte transfusion in patients with neutropenia after chemotherapy, in severe infection and sepsis, in acute myeloid leukaemia etc. PEGylation of GCSF has been shown to increase its in-vivo half-life and thereby the drug's bioavailability and chemical potency [6]. This PEGylated form of GCSF, "PEG-GCSF", is a long acting form that requires only a once-per-cycle administration for the management of chemotherapy-induced neutropenia leading to a greater likelihood of patient compliance and decreased burden for patients, caregivers, and healthcare professionals [7].

Preparation of PEGylated proteins involves two major unit operations PEGylation reaction and chromatographic separation of mono-PEGylated product from un-PEGylated and multi-PEGylated variants. A number of process schemes for PEGylation of proteins and purification of PEGylated proteins have been proposed in the last decade.

U.S. patent application Ser. No. 15/326,277 relates to a process for PEGylation and purification of PEG-GCSF. However, the prior art document reports a long time for completion of PEGylation reaction (12-18 h) and utilizes a conventional bind and elute cation exchange chromatography for purification. However, a faster PEGylation reaction is required along with a displacement mode counter current continuous chromatography.

Another U.S. Pat. No. 8,586,710 discloses an improved process for PEGylation of r-met-HuG-CSF, in which the reaction is carried out in the presence of sugar alcohols, for example, sorbitol. The process herein claims the increase in % yield of mono-PEGylation in the presence of 5% sorbitol (82% vs 74% in absence of sorbitol). The % conversion of mono-PEGylated r-met-HuG-CSF is >98% wherein the PEGylation reaction is carried out overnight at 2-8° C. in the presence of sorbitol. However, the prior art document does not report any improvement in the reaction completion time, and has poor productivity.

Similarly, numerous non-patent prior art documents disclose methods for PEGylation of GCSF. For instance, Tiwari et al., reports an increase in the yield of mono-PEGylated GCSF upto 80% after 5 hrs of PEGylation reaction at room temperature. [4]. Another research article by Puchkov et al. reported approximately 85% product yield of PEGylated GCSF when the reaction was carried out for 18 h at 4° C. [6].

All the above prior arts disclose that the % mono-PEG conversion is somewhat similar in the range of 70-80%, while the reaction completion time varies from 5-24 hrs. This indicates that that productivity of the reaction is dependent on the reaction completion time and is the major factor behind low productivity (mg of mono-PEGylated protein produced/unit time) of PEGylation step.

Post PEGylation, cation exchange chromatography has been the most widely utilized chromatography for purification of mono-PEGylated GCSF from impurities like multi-PEGylated and un-PEGylated species. Majority of published reports utilize weak or strong cation exchange chromatography for purification of mono-PEGylated GCSF [4,6,8,9]. Sample displacement chromatography has been applied to the purification of small molecules and proteins.

U.S. Pat. No. 9,067,990B2 relates to compositions and methods for isolating and purifying proteins for e.g. antibodies, host cell proteins incorporating a displacement chromatographic step. This mode of chromatography has recently been applied in a multi column continuous chromatography setup for the separation of monoclonal antibody charge variants. However, the prior art utilizes a complex linear gradient for achieving separation. Therefore, a method is required which removes impurities in flowthrough and utilize a simpler step elution protocol.

Thus, the major limitations of prior arts cited above is that most of them operate in bind and elute mode, and thus utilize shallow linear gradients along with peak cutting for the separation of different PEG-protein conjugates. This necessitates, in-process quality checks before pooling of fractions which makes the overall purification process lengthy and complex. It also increases the chances of errors and leads to fluctuations in chromatography yield and performance between batches. Thus there is a need to develop improved process which is able to remove all the multi-PEGylated impurities in the loading flow-through, simplifying the overall purification process and results in higher productivity and improved resin utilization.

SUMMARY

The primary objective of the present invention is to provide a highly efficient, robust, economical, scalable, industrially viable and productive process of PEGylation and purification for therapeutic proteins.

Another objective of the present invention is to convert the established batch process to an integrated continuous process and further improve the productivity and thereby the economics of the process.

Yet another objective of the invention is to provide a PEGylation reaction having high yield and shorter time of completion and a displacement mode cation exchange chromatographic separation post PEGylation.

Still another objective of the invention is to establish a rapid method for N-terminal PEGylation reaction.

Yet another objective of the present invention is to integrate the established PEGylation and purification process to any existing manufacturing process to offer an end-to-end integrated assembly from inclusion bodies to purified PEGylated product.

The present invention provides a novel process of PEGylation and purification of protein therapeutics. More particularly, the present invention relates to a process for PEGylation of therapeutic proteins and purification of the PEGylated therapeutic proteins. The therapeutic proteins may be selected from cytokines such as interferons, growth factors, tumour necrosis factor, interleukins, and colony stimulating factors.

A rapid and highly productive PEGylation process attaining reaction completion in 50-70 minutes and a displacement mode cation exchange chromatography post PEGylation are the major highlights of the developed process.

Particularly, the present invention discloses a novel and rapid process for N-terminal PEGylation of proteins. The developed PEGylation protocol provides high yield of PEGylated recombinant proteins (with % mono-PEG conversion of ≥70%) with a reaction completion time of 50-70 minutes indicating higher productivity and a significant reduction in the reaction completion time (faster kinetics), compared to all previous prior arts. The reaction depends on the factors like temperature, protein concentration, PEG: protein ratio, pH and buffer composition. The present invention when combined with continuous technologies like coiled flow inversion reactor, continuous chromatography and single pass tangential flow filtration offers benefits much greater than any batch process.

In yet another embodiment of the present invention, the established novel batch process is easily adapted to continuous operation with benefits like increased productivity (4-7×), higher equipment utilization (4-5×), and reduction in resin volume utilization (4×) compared to batch. Effectively, the integrated continuous manufacturing process has the potential to facilitate significant reductions in manufacturing costs and facility size while improving consistency in product quality.

In yet another embodiment of the invention, the established novel PEGylation and purification process can be integrated to any existing manufacturing process to offer an end-to-end integrated assembly from inclusion bodies to purified PEGylated product.

DETAILED DESCRIPTION

Figure 1:
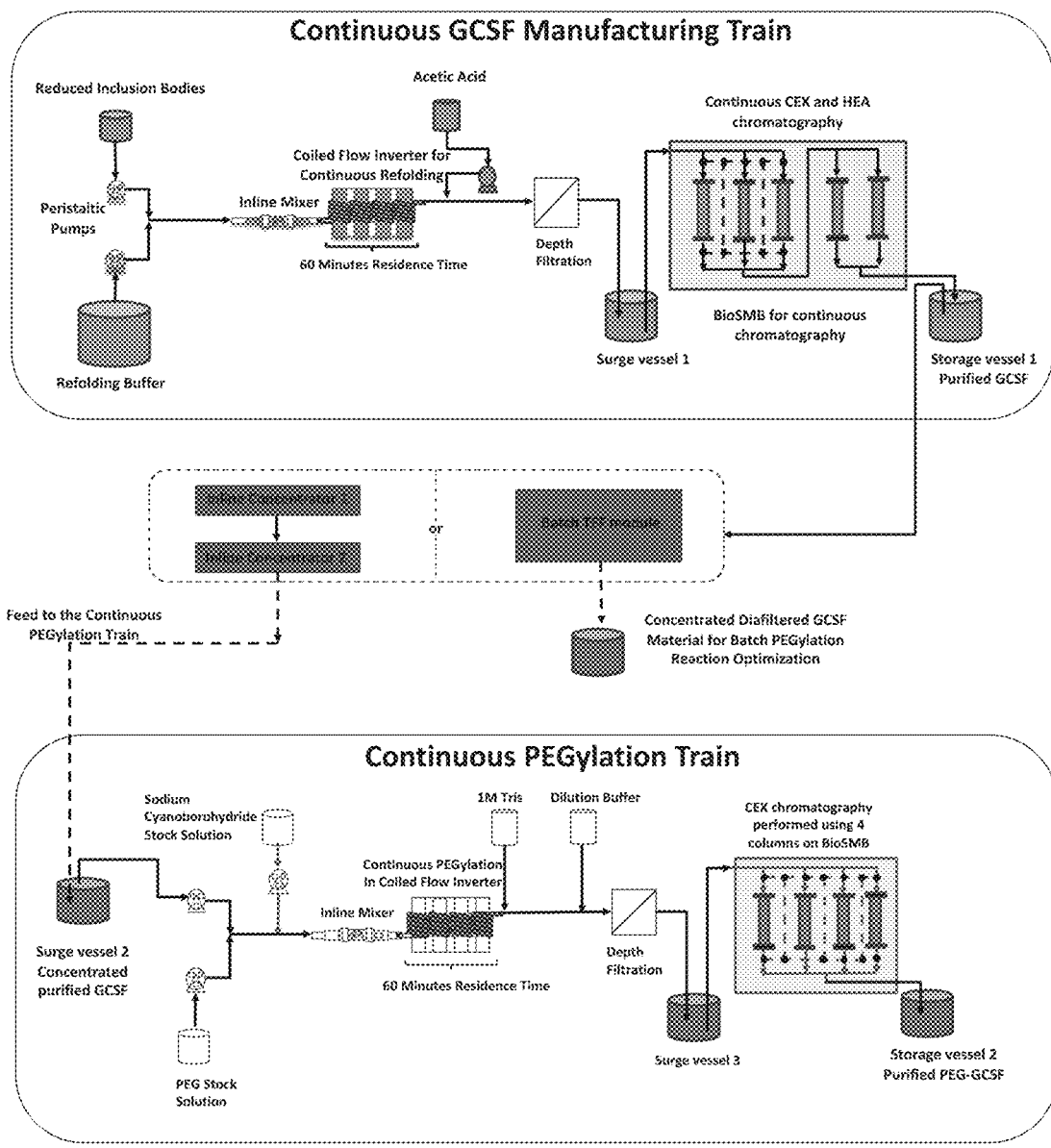
FIG. 1 represents architecture of the integrated continuous end-to-end PEGylation and purification train showcasing production of purified PEG-GCSF from inclusion bodies.

Accordingly, present invention provides a novel process of PEGylation and purification of therapeutic proteins. The PEGylation reaction according to the present invention provides a high yield of PEGylated recombinant proteins (with % mono-PEG conversion of ≥70%) with a much faster reaction completion time of 50-70 minutes. Thereafter a displacement mode cation exchange chromatography (CEX) is utilized which is able to remove all the multi-PEGylated impurities in the loading flow-through, simplifying the overall purification process. This when coupled with continuous chromatography is able to provide a process resulting in higher productivity and improved resin utilization. Other approach used in this invention is the application of displacement chromatography for separation of PEGylated proteins. One more approach in this invention includes a modified design of a coiled flow inverter (CFI) first introduced as a heat exchanger in U.S. Pat. No. 7,337,835, which has been employed for continuous PEGylation of the molecule. Its utilization as an apparatus for continuous PEGylation of therapeutic proteins is unique and has not been attempted till date.

The particular description and embodiments set forth in the specification below are merely exemplary of the wide variety and arrangement of reactions which can be employed in the present invention. The present invention may be embodied in other specific forms without departing from the spirit or essential characteristics thereof. Thus, unless expressly stated otherwise, all embodiments are within the scope of the present invention.

Accordingly, those of ordinary skill in the art will recognize that various changes and modifications of the embodiments described herein can be made without departing from the scope of the invention. In addition, descriptions of well-known functions and constructions are omitted for clarity and conciseness.

Features that are described and/or illustrated with respect to one embodiment may be used in the same way or in a similar way in one or more other embodiments and/or in combination with or instead of the features of the other embodiments.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention are provided for illustration purpose only and not for the purpose of limiting the invention.

The terminology used herein is for the purpose of describing particular embodiments only and is not intended to be limiting scope of the invention. It is to be understood that the singular forms "a," "an," and "the" include plural referents unless the context clearly dictates otherwise. It should be emphasized that the term "comprises/comprising" when used in this specification is taken to specify the presence of stated features, steps or components but does not preclude the presence or addition of one or more other features, integers, steps, components or groups thereof.

The present invention is directed to a novel process of PEGylation and purification of therapeutic proteins. More particularly, the present invention relates to a process for PEGylation of therapeutic proteins and purification of the PEGylated therapeutic proteins. The therapeutic proteins may be selected from cytokines such as interferons, growth factors, tumour necrosis factor, interleukins, and colony stimulating factors.

The PEGylation of the therapeutic proteins is typically carried out by its incubation with functionalised PEG followed by a series of chromatography steps for purification of PEGylated protein from product and process related impurities.

The process of preparation of PEGylated therapeutic proteins, comprises:
a. reacting a therapeutic protein with a functionalised PEG, wherein the functionalised PEG: protein ratio is taken in the range, 2:1 to 10:1 (w/w) to obtain an imine compound;
b. incubating the sample with the functionalised PEG with or without reducing agent at temperature in the range of 10-37° C. for a time period in the range of 50-70 min or until % mono-PEG conversion reaches ≥70%;
c. The mixture of step b is quenched by addition of base in the concentration range of 0.05-2 M
d. diluting the mixture of step (c) with dilute acid to reduce the pH of the PEGylated protein in the mixture in the range of 3-6 and conductivity to <3 mS/cm in order to condition the sample for binding on cation exchange chromatography;
e. subjecting the PEGylated protein obtained from step (d) to cation exchange chromatography in displacement mode by loading the PEGylated protein onto the CEX column to perform cation exchange chromatography using cation exchange resin;

The base may be selected from the group including but not limited to Tris, NaOH, Ammonium hydroxide.

The dilute acid may be selected from acetic acid, citric acid, hydrochloric acid or mixture in the molar range of 0.05-5M to reduce pH in the range of 3-6 and achieve dilution in the range of 10-15 folds.

The reducing agent may be a mild reducing agent such as but not limited to sodium cyanoborohydride, sodium borohydride etc. added to the mixture in the concentration range of 1-100 mM.

The process according to the present invention can be operated in batch, semi-continuous or fully continuous mode.

In continuous mode PEGylation and quenching is carried out in a Coiled flow inverter reactor (CFIR) wherein
a. PEGylation performed in the CFIR with protein and functionalized PEG pumped at equal flow rate at the entry of the CFIR;
b. output from step a is quenched as per step (c) of paragraph [0035] by pumping base at a flow rate which is 5-10% v/v of the output flow rate;
c. output from step b is conditioned as per step (d) of paragraph [0035] by pumping dilute acid to achieve dilution in the range of 10-15 folds;
d. combined flow from step a, step b and step c is the loading flow rate for the cation exchange chromatography.

The process of chromatography comprises:
a. subjecting the PEGylated protein to cation exchange chromatography in displacement mode by loading the PEGylated protein onto the CEX column to perform cation exchange chromatography using cation exchange resin;
b. chromatography can be carried out by loading of the resin between 5-100% of breakthrough capacity or till the point where desired displacement of multi-PEGylated impurities is obtained.

Cation exchange resin is selected from weak cation exchange resin, strong cation exchange resin and multimodal resin, wherein:
a. Weak cation exchange resin is selected from the group not limited to Fractogel COO", CM Sepharose, Toyopearl CM 650 M, Ceramic HyperD CM
b. Strong cation exchange resin is selected from the group not limited to like Eshmuno CPX, Poros HS, Poros XS, Fractogel SO3, SP Sepharose, Capto S, Capto SP ImpRes, S Hypercel, UNOsphere S
c. Multimodal resin is selected from the group not limited to like Capto MMC, Capto Adhere, MEP Hypercel, HEA Hypercel and PPA Hypercel.
d. The process of chromatography can be performed in batch or continuous counter current mode Continuous chromatography can be carried out by utilizing ≥2 column setup on any continuous chromatography equipment not limited to like Cadence™ BioSMB, Akta™ pcc, BioSC® Lab Scale, Contichrom CUBE, Semba ProPD™.

The therapeutic proteins include but are not limited to cytokines such as interferons (IFNs), growth factors, tumour necrosis factor, interleukins, and colony stimulating factors. The colony stimulating factors include myeloid hematopoietic growth factors such as granulocyte colony-stimulating factor [G-CSF] and granulocyte-macrophage colony-stimulating factor [GM-CSF]. The therapeutic protein is taken in a concentration in the range of 2-20 mg/mL such that the functionalised PEG: protein ratio is 2:1 to 10:1 (w/w);

The present invention also provides a system for carrying out process of preparation and purification of therapeutic proteins. The unit operations of PEGylation and chromatography are in continuous or semi continuous mode. In an embodiment, a coiled flow inversion reactor is utilized for continuous PEGylation; and a continuous chromatography system is utilized for continuous chromatography in an integrated continuous PEGylation train, which in turn is integrated with previously established continuous GCSF manufacturing train. The system utilized for continuous mode of operation comprises of a surge vessel (3) with volume 5 times the cation exchange loading volume placed in between the PEGylation and chromatography step wherein the vessel is used for in-process analysis using offline/atline/online sampling.

The following description of the invention is intended to illustrate the invention and should not be construed to limit the scope of the invention.

In an embodiment, the invention comprises a method of rapid N-terminal PEGylation of GCSF and purification of GCSF based on cation exchange chromatography post PEGylation. In an embodiment, the purification method of the batch process is converted to continuous operations.

In the present invention, cation exchange chromatography in displacement mode has been established for purification of mono-PEGylated GCSF from impurities like multi-PEGylated and un-PEGylated species. The developed CEX method is able to remove all the multi-PEGylated impurities in the loading flow-through, simplifying the overall purification process. This when coupled with continuous chromatography is able to provide a process with higher productivity and improved resin utilization.

The invention also relates to integrated continuous operation of PEGylation reaction and chromatography, the two main unit operations involved in the downstream process of any PEGylated protein. The invention does so by utilizing continuous technologies for both the steps. A modified design of a coiled flow inverter (CFI) first introduced as an heat exchanger in U.S. Pat. No. 7,337,835, has been employed for continuous PEGylation of the molecule [15]. Periodic counter-current chromatography is utilized for continuous operation of the cation exchange chromatography step. Utilizing of cation exchange chromatography in a continuous chromatography setup has been shown to offer removal of multi-PEGylated impurities in flow through along with improved resin utilization. All unit operations (PEGylation, continuous chromatography) have been connected together to establish an integrated continuous PEGylation train (FIG. 1). This established train has also been integrated to our previously established continuous GCSF manufacturing train [16], to offer an end-to-end integrated assembly from inclusion bodies to purified PEGylated product (FIG. 1). The end-to-end integrated assembly is run continuously and consistency of the process as well as that of product quality is successfully demonstrated.

The process for N-terminal PEGylation as disclosed herein provides high yield of PEGylated recombinant protein (with % mono-PEG conversion of ≥70%) with a reaction completion time of about one hour indicating higher productivity and a significant reduction in the reaction completion time (faster kinetics), compared to all previous prior arts.

According to the present invention, the unit operations of PEGylation and chromatography are converted to continuous mode with the help of enabler technologies like coiled flow inversion reactor for continuous PEGylation and counter-current chromatography for continuous chromatography and the steps comprises:

(1) The protein is PEGylated by using a functionalised PEG compound such as Methoxy PEG Propionaldehyde (mPEG-ALD), (mPEG-ALD), Methoxy PEG Succinimidyl propionate, Methoxy PEG N-hydroxy succinimide, Methoxy PEG Succinimidyl carbonate, Methoxy PEG Maleimide etc.; having molecular weight from 5-20 kDa; wherein the PEG: protein ratio is in the range of 2:1 to 10:1 and protein concentration is in the range of 2 mg/mL to 20 mg/mL.

(2) reducing the imine obtained from the first step to a secondary amine in presence of catalytic amounts (1-100 mM) of catalysts such as sodium cyanoborohydride, sodium borohydride etc;

(3) quenching the reaction when it reaches the maximum mono-PEG concentration, or at a time-point of 50-70 min;

(4) PEGylation reaction output was diluted with dilute acid to reduce the pH of the PEGylated protein to 4 and conductivity to <3 mS/cm before loading onto the CEX column to perform cation exchange chromatography using either of weak cation exchange resin such as but not limited to, Fractogel COO−, CM Sepharose, Toyopearl CM 650 M, strong cation exchange resins like Eshmuno CPX, Poros HS, Poros XS, Fractogel SO3, SP Sepharose FF, or multimodal resin is selected from the group not limited to like Capto MMC, Capto Adhere, MEP Hypercel, HEA Hypercel and PPA Hypercel.

PEG conjugation with protein can occur at various functional groups of the polypeptide chain that have atoms with unpaired electrons [6]. A variety of chemical reactions are used to attach PEG to proteins [5]. As PEG by itself is chemically non-reactive, different functional groups are added to it, at one or both termini, to confer reactivity [17]. The choice of PEG functional group depends on the corresponding reactive group on the protein molecule [18]. The functionalised PEG compound is selected from the group not limiting to Methoxy PEG Propionaldehyde (mPEG-ALD), (mPEG-ALD), Methoxy PEG Succinimidyl propionate, Methoxy PEG N-hydroxy succinimide, Methoxy PEG Succinimidyl carbonate, Methoxy PEG Maleimide etc.; The PEG: protein ratio is in the range of 2:1 to 10:1.

Example 1—Preparation of PEGylated GCSF

The GCSF protein utilized for PEGylation is a recombinant GCSF with N-terminal methionine residue [16]. Site-specific, N-terminal PEGylation of GCSF at methionine residue was targeted, for which 5-20 kDa Methoxy PEG Propionaldehyde (mPEG-ALD) was utilized. PEG aldehyde forms an imine with the amino group, which is then reduced to a secondary amine in presence of catalytic amounts of (5-50 mM) sodium cyanoborohydride, sodium borohydride etc [19].

Purified GCSF obtained from the GCSF manufacturing process was concentrated and buffer exchanged into the desired buffer using a 10 kDa TFF membrane. PEGylation was performed by incubating purified GCSF sample with 20 kDa mPEG-ALD (100 mg mPEG/mL buffer stock) in the presence of 20 mM sodium cyanoborohydride (2M stock) as catalyst.

Figure 2:
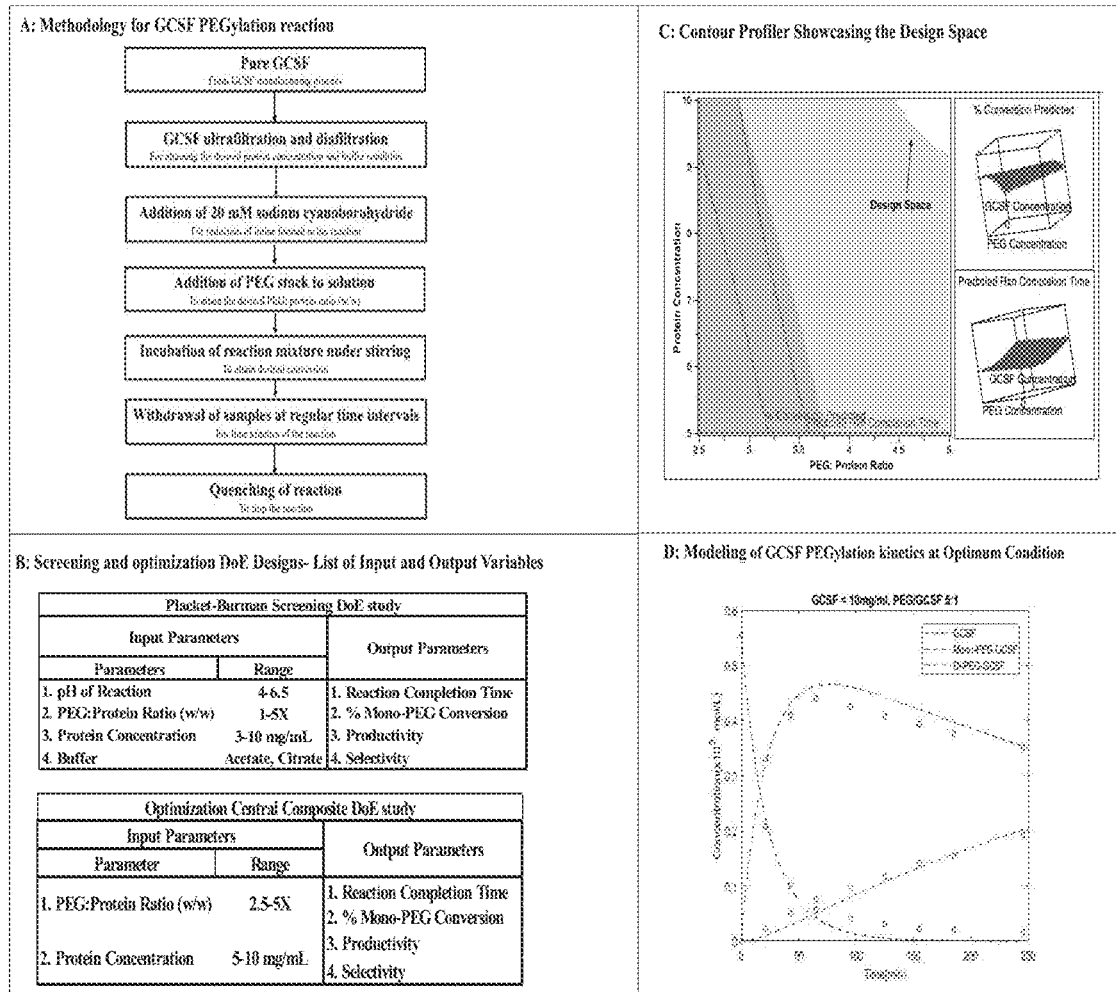
FIG. 2 represents (A) Proposed methodology for GCSF PEGylation reaction, (B) Details of the screening and optimization DoE study-list of input variables (along with their range studies) and output variables, (C) design space for operation under defined set of constraints, and (D) Modelling of GCSF PEGylation kinetics at the optimal condition.

Reaction mixture was incubated for a maximum of 5 hrs at room temperature. The reaction was carried out at 10 mL scale, with constant mixing on a magnetic stirrer (300 rpm). Samples were withdrawn at different time points (10, 30, 60, 90, 120, 150, 180, 240, 300 min) during the reaction and were analysed using CEX-HPLC (cation exchange-HPLC) and SEC-HPLC (size exclusion-HPLC) to understand reaction kinetics and identify reaction completion time. Samples at different time points were quenched by addition of 1M Tris stock solution. FIG. 2A, depicts the schematics of the PEGylation protocol followed in the study.

Typical optimization objectives for a protein PEGylation reaction include conversion yield, selectivity of mono-PEGylation, time of reaction (productivity), scalability and robustness of reaction. These process and product attributes depend on a variety of factors such as the properties of the protein molecule, the PEGylation reagent, as well as the reaction conditions such as protein concentration, PEG: protein ratio (w/w), pH, temperature, and buffer composition. A two staged design of experiments (DoE) study was performed with the first stage utilized for screening of variables and the second stage to understand the interactions between the significant variables and identification of the optimal conditions. FIG. 2B, shows the list of input and output variables considered in the DoE studies.

Based on the results from the DoE studies, a design space for achieving higher reaction conversion and lower completion time was defined and has been illustrated via contour profiles (FIG. 2C). Setting the constraints for % mono-PEG conversion (≥70%) and reaction completion time (≤75 min), acceptable ranges for protein concentration (9-10.0 mg/mL) and PEG:protein ratio (4-5×) were identified. Further, protein concentration of 10 mg/mL and PEG:protein ratio of 5× were chosen as operating set points so as to minimize the reaction completion time (60 min).

From the kinetics data for the optimum operating condition (protein concentration 10 mg/mL and PEG: protein ratio of 5×), it is evident that the reaction has to be quenched just before it reaches the maximum mono-PEG concentration, at a time-point of 50-70 min, after which further increase in reaction time leads to conversion of the formed mono-PEGylated species to multi-Pegylated species (FIG. 2D). This results in an overall decrease in the reaction selectivity.

Hence, in order to maximize % mono-PEG conversion, productivity and selectivity reaction must be stopped just before it reaches the maximum mono-PEG concentration [20]. The faster kinetics of reaction increases the sensitivity of the system towards quenching and necessitates a strong control over the reaction residence time.

Cation Exchange Chromatography-Based Purification

Figure 3:
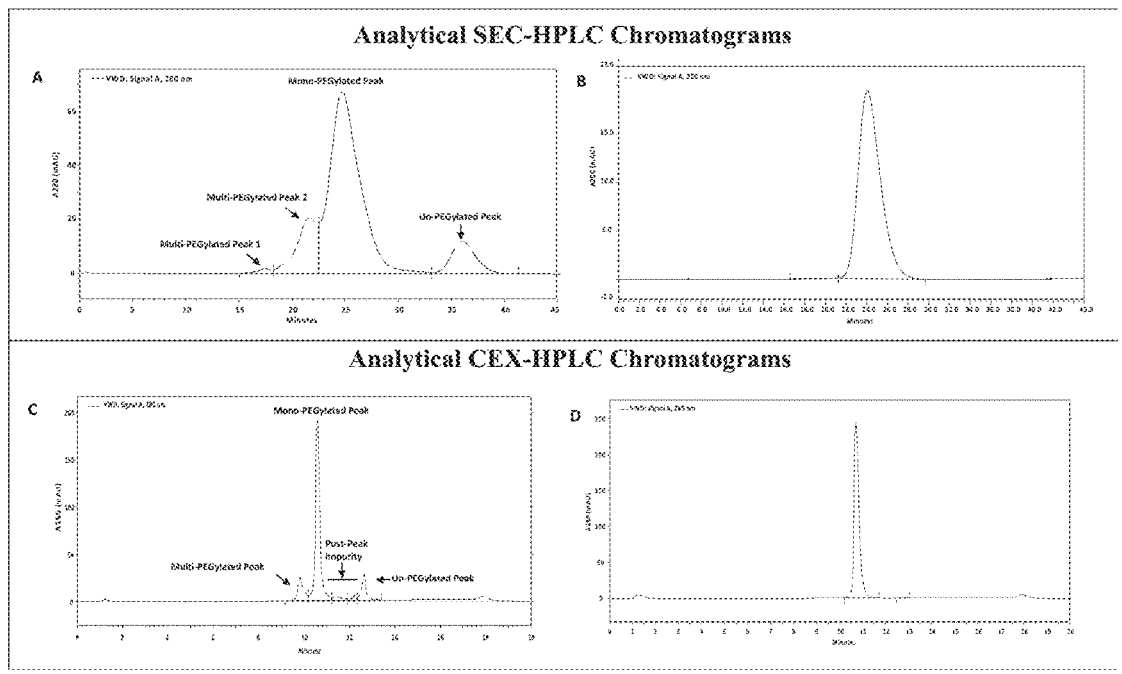
FIG. 3 represents analytical size exclusion (SEC-HPLC) and analytical cation exchange (CEX-HPLC) chromatograms for (A, C) PEGylation output and (B,D) purified cation exchange elute respectively.

As can be seen from the analytical SEC chromatogram, the PEGylation output at the optimized condition consisted of four peaks (FIG. 3A). These include two multi-PEGylated species (~15%), one mono-PEGylated specie (~72%), and one un-PEGylated specie (~13%). For the same sample (PEGylation output), the CEX-HPLC could resolve the multi-PEGylated species based on charge, as pre peak and post main peak multi-PEGylated species, while the un-PEGylated species eluted last (FIG. 3C). Quenched PEGylation reaction output (pH 8) was diluted 10-15 times with dilute acetic acid, to reduce the pH to 4 and conductivity to <3 mS/cm before loading onto the CEX column. This dilution was performed to reduce sample viscosity, associated column back-pressure and column fouling due to non-specific association of PEG. [1,21].

The cation exchange chromatography purification is developed post PEGylation, using a weak cation exchange resin such as but not limited to, Fractogel COO−, CM Sepharose, Toyopearl CM 650 M, strong cation exchange resins such as but not limited to Eshmuno CPX, Poros HS, Poros XS, Fractogel SO3, SP Sepharose FF and multimodal resin such as Capto MMC, Capto Adhere, MEP Hypercel, HEA Hypercel and PPA Hypercel. The column is loaded upto 5% to 100% breakthrough and removal of multi-PEGylated species is achieved in flow through. After removal of the multi-PEGylated species in loading flow-through, the bound mono-PEGylated, post peak multi-PEGylated and un-PEGylated species are resolved by elution in salt step gradients.

Figure 4:
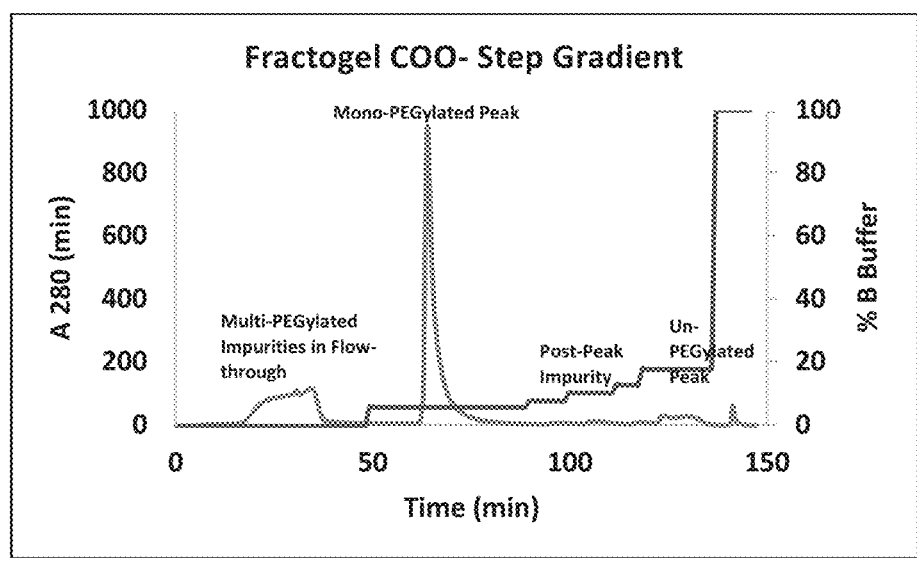
FIG. 4 represents process chromatograms for cation exchange chromatography-Fractogel COO− step elution.

In an embodiment, a cation exchange chromatography purification step was developed, post PEGylation, using a weak cation exchange resin such as but not limited to, Fractogel COO−, CM Sepharose, Toyopearl CM 650 M and strong cation exchange resins such as but not limited to Eshmuno CPX, Poros HS, Poros XS, Fractogel SO3, SP Sepharose FF. Binding of multi-PEGylated species with the resin was found to weak, leading to removal of the multi-PEGylated species during column loading in flowthrough. Loading the column up to 5% breakthrough (batch loading, dynamic binding capacity, ~5 mg/mL of resin) resulted in removal of more than 60% multi-PEGylated impurities in flowthrough. However, in order to achieve complete removal of the pre peak multi-PEGylated species in flow-through, the column loading (amount of protein, % breakthrough) had to be increased. It was identified, that by loading the column to 100% breakthrough (~7.5 mg/mL of resin), complete removal of acidic multi-PEGylated species could be obtained in flow through. This can be attributed to the fact that on loading the column beyond the 5% breakthrough (dynamic binding capacity) remaining multi-PEGylated species, which are weakly bound to the resin are displaced by tighter binding species like mono-PEG GCSF and un-PEGylated GCSF due to competition for binding sites. Binding strength of the various PEG conjugates onto the column follows the following order-multi-Pegylated species<mono-PEGylated<un-PEGylated protein. This chromatographic behaviour can be referred to as displacement mode chromatography. After removal of the multi-PEGylated species in loading flowthrough, the bound mono-PEGylated, post peak multi-PEGylated and un-PEGylated species were resolved by elution in salt step gradients (FIG. 4).

Continuous PEGylation Train

This continuous PEGylation process is integrated with a previously established GCSF manufacturing process to obtain an end-to-end continuous PEGylation platform.

Once the batch process for purification of PEG-GCSF was in place, the next immediate goal was to convert the batch process to continuous. Established purification process for PEG-GCSF consisted of two major unit operations-PEGylation and chromatography. Each of these unit operations was targeted individually and converted to continuous mode with the help of enabler technologies like coiled flow inversion reactor for continuous PEGylation and counter-current chromatography using the BioSMB system for continuous chromatography. The optimized batch protocols for PEGylation and chromatography were adapted for continuous operation with certain modifications. An integrated continuous PEGylation process consisting of CFIR, depth filter, and continuous chromatography was established. Moreover, this established continuous PEGylation process was integrated with a previously established GCSF manufacturing process to obtain an end-to-end continuous PEGylation platform. FIG. 1 shows the architecture of the developed integrated continuous downstream process for PEG-GCSF.

Purified GCSF obtained from the GCSF manufacturing train was continuously concentrated with the help of two 10 kDa inline concentrator (ILC) units present in series. Output from the ILC units was collected in surge vessel 2, from where it was fed to the CFIR for continuous PEGylation. Optimized conditions for PEGylation obtained from the batch DoE experiments were directly used for continuous operation. All the process feed streams for the continuous process were prepared using the same compositions as those used in batch PEGylation. Initial mixing of the mPEG-ALD, sodium cyanoborohydride, and protein was achieved in an inline dynamic mixer. The dynamic mixer unit consisted of a polypropylene cylinder with magnetic beads inside it. The unit was stirred using a magnetic stirrer. Protein (20 mg/mL) was pumped at a flow rate of 0.33 mL/min, mPEG-ALD stock (100 mg mPEG/mL of buffer) was pumped at 0.33 mL/min and sodium cyanoborohydride (0.35 M) at 0.04 mL/min into the dynamic mixer. The sample from the dynamic mixer was continuously pumped into the CFIR. A residence time of 1 h was provided in the CFIR after which the PEGylation reaction was quenched by inline addition of 1 M Tris at 0.05 mL/min. This was followed by inline dilution of sample with acetic acid (0.1 M acetic acid) at a flow rate of 9.25 mL/min, resulting in a 13× dilution of reaction output. After this the sample was continuously filtered using a 250 $cm^2$ depth filter (Pall Lifesciences). Output from the depth filter flowed into a 500 mL Schott Duran bottle that served as surge vessel 3 (FIG. 1). The vessel is used for in-process analysis using offline/atline/online sampling.

Sample from surge vessel 3 was continuously loaded onto a continuous chromatography system where cation exchange chromatography was carried out in a continuous fashion. A four-column CEX (Fractogel COO—) setup operated in periodic counter-current chromatography (PCC) mode was used for continuous chromatography (FIG. 1).

Continuous chromatography in periodic counter-current mode requires the loading of column close to the static binding capacity to improve resin utilization. In a four column PCC setup, the unbound protein lost during loading of the first column (in flow-through and the wash step) is captured onto a second column present in series, while the remaining two parallel column undergo non-loading steps. The operation of the developed displacement mode chromatography in continuous multi-column system (PCC mode) provides a promising strategy for complete removal of multi-PEGylated impurities in flow through mode. We would like to highlight that the benefits of displacement mode chromatography in the continuous setup are more significant compared to in batch setup, as in continuous setup increased loading results in complete removal of impurities without any loss of product as the product lost in flow through is captured by the second column in series. This depicts that the application of continuous chromatography in displacement mode results in better purity along with higher resin utilization. This led to an overall simplification of the chromatographic process, resulting in >99% pure mono-PEGylated product (SEC-HPLC and IEX-HPLC) and product recovery of >95% without any complex peak cutting.

Figure 5:
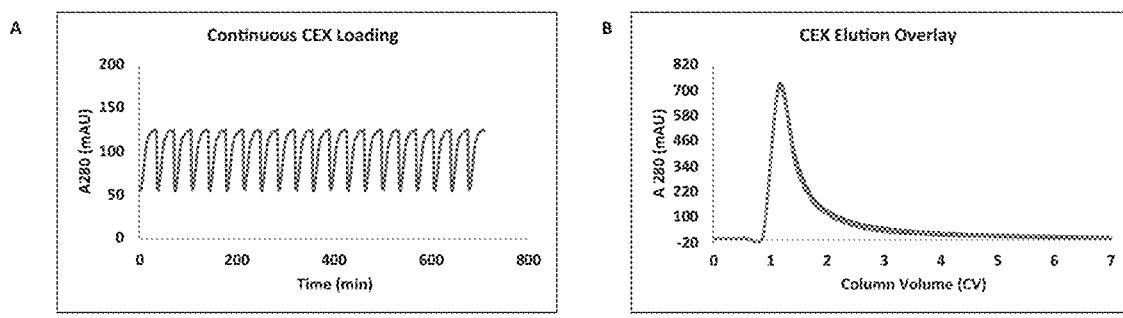
FIG. 5 represents chromatographic profile for the (A) 4 column continuous CEX loading and, (B) overlays of all CEX elution profiles.

Continuous chromatography was carried out on a continuous chromatography system, utilising 4 column periodic counter-current (PCC) setup, for 20 column operations (5 cycles). The unformulated PEG-GCSF drug substance (DS) was produced in a cyclic discontinuous manner, with ~130 mg protein (~0.46 mg/mL) entering the storage vessel 2 after every 34 mins (3.8 mg/min production rate). Overall process yield of ~70% (from purified GCSF to unformulated PEG-GCSF DS) was achieved in the PEGylation train. The performance of the process was measured in terms of UV profiles and quality attributes. FIG. 5A shows the UV profiles of the continuous CEX loading. It is evident that UV profiles of the loading step are consistent throughout the operation time. FIG. 5B shows the overlays of all CEX elution profiles and demonstrate reproducibility of performance of CEX operation in the entire period.

Various process parameters and quality attributes were measured regularly after every run to monitor process consistency. These observations are tabulated in Table 1. It is evident that various quality attributes at the end of the purification train are consistent throughout the entire run. More importantly, final unformulated drug substance is well within acceptance limits with % IEX-HPLC purity and % SEC-HPLC purity>99%.

Table 2 compares the performance of the continuous PEG-GCSF process with the batch process. Continuous process contrary to batch eliminates shutdown time resulting in increased productivity, smaller cycle time and enhanced equipment utilization. Continuous operation of chromatography in the counter-current mode has been shown to result in better resin utilization with drastic decrease in column volumes. This agrees with what other researchers have reported upon use of continuous processing and has the potential to significantly reduce cost of goods and the facility footprint.

Table 1. Quality attributes for the integrated continuous downstream process for PEG-GCSF:

| Process Step | Concentration (mg/mL) | % RP-HPLC Purity | % IEX-HPLC Purity | % SEC-HPLC Purity |
| --- | --- | --- | --- | --- |
| Storage Vessel 1 (Purified GCSF) | 0.85 ± 0.05 | 99.5 ± 0.2 | nd* | 99.5 ± 0.1 |
| Surge Vessel 2 (ILC Output) | 20 ± 0.1 | nd* | nd* | nd* |
| Surge Vessel 3 (PEGylation Output) | 10 ± 0.1 | nd* | 75 ± 0.8 | 74 ± 1 |
| Storage Vessel 2 (Purified PEG-GCSF) | 0.46 ± 0.05 | nd* | 99.6 ± 0.2 | 99.4 ± 0.1 |

*nd stands for not done

Table 1 provides the summary of concentration and purity of PEG-GCSF in each vessel. The storage vessel used as inlet for ILC contained 0.85±0.05 mg/ml protein with 99.5±0.2% purity with an output of 20±0.1 mg/ml protein which was used as an inlet feed for PEGylation reaction. The PEGylation reaction in CFIR resulted in 10±0.1 mg/ml protein concentration and 74±1% purity which was purified using IEX and SEC chromatography with elute containing purified GCSF of 0.46±0.05 mg/ml concentration and purity of 99.4±0.1%.

Table 2. Comparison of Continuous and Batch PEGylation process.

| Parameter | Performance of continuous processes with respect to batch ones |
| --- | --- |
| PEGylation in CFIR | |
| Reactor specific productivity (mg/min/mL reactor) | 7 times higher |
| Cycle time | 6 times lower |
| Equipment utilization | 5 times higher |
| Continuous CEX chromatography | |
| Resin specific productivity (mg/min/mL resin) | 4 times higher |
| Cycle time | 4.5 times lower |
| Equipment utilization | 4 times higher |
| Column volume | 6% (×4) |

Table 2 summarizes the performance of continuous process as compared to batch process. The established integrated process provided product with all quality attributes well within the permissible limits along with benefits of continuous processing in the form of increased productivity (4-7×), higher equipment utilization (4-5×) and reduction in resin volume utilization (4×) and lower cycle time (4.5-6×) compared to batch.

REFERENCES

[1] S. Jevševar, M. Kunstelj, V. G. Porekar, PEGylation of therapeutic proteins, Biotechnol. J. Healthc. Nutr. Technol. 5 (2010) 113-128.
[2] J. Dozier, M. Distefano, Site-specific PEGylation of therapeutic proteins, Int. J. Mol. Sci. 16 (2015) 25831-25864.
[3] S. Awwad, C. Ginn, S. Brocchini, The case for protein PEGylation, in: Eng. Biomater. Drug Deliv. Syst., Elsevier, 2018: pp. 27-49.
[4] K. Tiwari, K. Kattavarapu, S. N. Shebannavar, S. Pokalwar, M. K. Mishra, U. K. S. Chauhan, Evaluation of pegylation reaction and purification of monopegylated recombinant human granulocyte colony stimulating factor, (2011).

[5] D. Pfister, M. Morbidelli, Process for protein PEGylation, J. Control. Release. 180 (2014) 134-149.

[6] I. A. Puchkov, N. V Kononova, A. I. Bobruskin, D. I. Bairamashvili, V. A. Mart'yanov, A. M. Shuster, Recombinant granulocyte colony-stimulating factor (filgrastim): Optimization of conjugation conditions with polyethylene glycol, Russ. J. Bioorganic Chem. 38 (2012) 479-487.

[7] S. Brokx, L. Scrocchi, N. Shah, J. Dowd, A demonstration of analytical similarity comparing a proposed biosimilar pegfilgrastim and reference pegfilgrastim, Biologicals. 48 (2017) 28-38.

[8] A. Raghuwanshi, S. K. Singh, N. Thaker, S. Shankar, P. Kardile, S. Singh, A novel process for purification of rhu-gcsf, (2017).

[9] N. U. Mohe, D. K. Paliwal, D. L. Saksena, C. Muralidharan, R. Shekhawat, S. S. Zawar, Process for gram scale production of PEG-r-metHuG-CSF, (2013).

[10] I. C. Wang, M. A. Us, G. Coppola, S. A, P. Examiner, C. M. Stanfield, F. Mccarter, M. L. Zacharakis, M. B. Clarke, Protein purification using displacement chromatography, 2017.

[11] M. S. Gajdosik, J. Clifton, D. Josic, Sample displacement chromatography as a method for purification of proteins and peptides from complex mixtures, J. Chromatogr. A. 1239 (2012) 1-9.

[12] M. Kotasińska, V. Richter, J. Thiemann, H. Schluter, Cation exchange displacement batch chromatography of proteins guided by screening of protein purification parameters, J. Sep. Sci. 35 (2012) 3170-3176.

[13] C. Wang, G. Coppola, C. Chumsae, Protein purification using displacement chromatography, (2017).

[14] O. Khanal, V. Kumar, K. Westerberg, F. Schlegel, A. M. Lenhoff, Multi-column displacement chromatography for separation of charge variants of monoclonal antibodies, J. Chromatogr. A. 1586 (2019) 40-51.

[15] K. D. P. Nigam, Baffle and tube for a heat exchanger, (2008).

[16] N. Kateja, H. Agarwal, V. Hebbi, A. S. Rathore, Integrated continuous processing of proteins expressed as inclusion bodies: GCSF as a case study, Biotechnol. Prog. 33 (2017) 998-1009.

[17] P. Madadkar, P. R. Selvaganapathy, R. Ghosh, Continuous flow microreactor for protein PEGylation, Biomicrofluidics. 12 (2018) 44114.

[18] M. J. Roberts, M. D. Bentley, J. M. Harris, Chemistry for peptide and protein PEGylation, Adv. Drug Deliv. Rev. 64 (2012) 116-127.

[19] J. E. Seely, S. D. Buckel, P. D. Green, C. W. Richey, Making site-specific PEGylation work: Purification and analysis of PEGylated protein pharmaceuticals present many challenges, Biopharm Int. 18 (2005) 30-41.

[20] A. Moosmann, J. Blath, R. Lindner, E. Müller, H. Böttinger, Aldehyde PEGylation kinetics: a standard protein versus a pharmaceutically relevant single chain variable fragment, Bioconjug. Chem. 22 (2011) 1545-1558.

[21] C. J. Fee, J. M. Van Alstine, PEG-proteins: Reaction engineering and separation issues, Chem. Eng. Sci. 61 (2006) 924-939.

What is claimed is:

1. A process of preparation and purification of PEGylated therapeutic proteins comprising:
    a. PEGylating a therapeutic protein by incubating the therapeutic protein with a functionalised PEG until % mono-PEG conversion reaches ≥70% to obtain a PEGylated protein;
    b. quenching the mixture obtained from step (a) by addition of a base;
    c. diluting the mixture of step (b) with a dilute acid to reduce the pH of the PEGylated protein in the mixture in the range 3-6 and conductivity to <3 mS/cm bmin in order to condition the mixture for binding on cation exchange chromatography (CEX); and
    d. subjecting the PEGylated protein obtained from step (c) to cation exchange chromatography (CEX) to obtain a PEGylated and purified therapeutic protein,
    wherein the CEX is performed in a displacement mode by loading the PEGylated protein onto a CEX column comprising a cation exchange resin.

2. The process as claimed in claim 1, wherein the process is operated in a batch, semi-continuous or fully continuous mode.

3. The process as claimed in claim 1, wherein said step (a) comprises:
    a. reacting the therapeutic protein with the functionalised PEG in a ratio of 2:1 to 10:1 in presence of a catalyst; and
    b. incubating the therapeutic protein with the functionalised PEG with or without a reducing agent at temperature in the range of 10-37° C. for a time period in the range of 50-70 min or until % mono-PEG conversion reaches ≥70%, to obtain the PEGylated protein.

4. The process as claimed in claim 1, wherein the PEGylated protein is quenched by addition of the base in the concentration range of 0.05-2 M.

5. The process as claimed in claim 1, wherein the therapeutic protein is a cytokine selected from the group consisting of interferons, growth factors, tumour necrosis factor, interleukins, and colony stimulating factors.

6. The process as claimed in claim 3, wherein the functionalised PEG is selected from the group consisting of Methoxy PEG Propionaldehyde (mPEG-ALD), Methoxy PEG Succinimidyl propionate, Methoxy PEG N-hydroxy succinimide, Methoxy PEG Succinimidyl carbonate, and Methoxy PEG Maleimide.

7. The process as claimed in claim 3, wherein the reducing agent is selected from the group consisting of sodium cyanoborohydride, and sodium borohydride, in the range of 1-100 mM.

8. The process as claimed in claim 1, wherein the dilute acid is selected from the group consisting of acetic acid, citric acid, hydrochloric acid, and any mixtures thereof so as to reduce pH in the range of 3-6 and achieve dilution in the range of 10-15 folds.

9. The process as claimed in claim 1, wherein the base is selected from the group consisting of Tris, NaOH, and Ammonium hydroxide.

10. The process as claimed in claim 3, wherein the catalyst is selected from the group consisting of sodium cyanoborohydride, and sodium borohydride.

11. The process as claimed in claim 5, wherein the therapeutic protein is granulocyte colony-stimulating factor (GCSF).

12. The process as claimed in claim 1, wherein the process is performed as a continuous mode in a Coiled flow inversion reactor (CFIR), the continuous mode comprising:
    a. performing PEGylation in the CFIR with the therapeutic protein and the functionalized PEG pumped at equal flow rate at an entry of the CFIR;
    b. quenching output from step (a) by pumping the base at a flow rate of 5-10% v/v of the output flow rate; and
    c. conditioning output from step (b) by pumping the dilute acid to achieve dilution in the range of 10-15 fold, and wherein combined flow from step (a), step (b) and step (c) constitutes a loading flow rate for the cation exchange chromatography (CEX).

13. The process as claimed in claim 1, wherein the cation exchange chromatography (CEX) comprises:
   subjecting the therapeutic protein, which has been PEGylated, quenched and conditioned, to the cation exchange chromatography (CEX) in the displacement mode by loading the PEGylated protein onto the CEX column to perform the cation exchange chromatography (CEX), and
   wherein the CEX is carried out by loading the cation exchange resin between 5-100% of breakthrough capacity or until a predetermined displacement of multi-PEGylated impurities is obtained.

14. The process as claimed in claim 13, wherein the cation exchange resin is a weak cation exchange resin selected from the group consisting of Fractogel COO$^-$, CM Sepharose, Toyopearl CM 650 M, and Ceramic HyperD CM.

15. The process as claimed in claim 13, wherein the cation exchange resin is a strong cation exchange resin selected from the group consisting of Eshmuno CPX, Poros HS, Poros XS, Fractogel SO3, SP Sepharose, Capto S, Capto SP ImpRes, S Hypercel, and UNOsphere S.

16. The process as claimed in claim 13, wherein the cation exchange resin is a multimodal resin selected from the group consisting of Capto MMC, Capto Adhere, MEP Hypercel, HEA Hypercel, and PPA Hypercel.

17. The process as claimed in claim 13, wherein the cation exchange chromatography is performed in a batch or continuous chromatography mode.

18. A system for carrying out the process as claimed in claim 1, comprising:
   a coiled flow inversion reactor for continuous PEGylation; and
   a system for continuous chromatography in the displacement mode,
   wherein unit operations of PEGylation and chromatography are in a continuous mode, and a continuous manufacturing train for the continuous mode comprises:
   a first surge vessel to receive the therapeutic protein from a plurality of inline concentrators;
   an inline dynamic mixer for mixing the functionalized PEG, a catalyst and the therapeutic protein;
   the coiled flow inversion reactor for continuous PEGylation;
   a depth filtration unit; and
   a second surge vessel with volume that is five times a cation exchange loading volume placed in between the PEGylation and chromatography step wherein the second surge vessel is for in-process analysis with offline, atline, or online sampling, and
   wherein the CEX is performed in a continuous chromatography setup.

* * * * *